United States Patent
Moisio

(10) Patent No.: US 7,181,411 B2
(45) Date of Patent: Feb. 20, 2007

(54) METHOD FOR SELLING UPGRADE PACKAGES IN PAPERMAKING

(75) Inventor: Pekka Moisio, Helsinki (FI)

(73) Assignee: Metso Paper, Inc., Helsinki (FI)

( * ) Notice: Subject to any disclaimer, the term of this patent is extended or adjusted under 35 U.S.C. 154(b) by 986 days.

(21) Appl. No.: 09/946,045

(22) Filed: Sep. 4, 2001

(65) Prior Publication Data

US 2003/0046124 A1    Mar. 6, 2003

(51) Int. Cl.
*G06F 9/44* (2006.01)
(52) U.S. Cl. .............................. 705/7; 705/30; 705/35; 705/39
(58) Field of Classification Search .................... 705/7, 705/8, 30, 35, 39
See application file for complete search history.

(56) References Cited

U.S. PATENT DOCUMENTS

| | | | |
|---|---|---|---|
| 5,208,765 A | * | 5/1993 | Turnbull ...................... 702/84 |
| 5,216,612 A | * | 6/1993 | Cornett et al. ................ 700/96 |
| 6,349,237 B1 | * | 2/2002 | Koren et al. .................. 700/96 |
| 6,415,196 B1 | * | 7/2002 | Crampton et al. .......... 700/100 |

FOREIGN PATENT DOCUMENTS

WO    WO0106612 A1  *  1/2001

* cited by examiner

*Primary Examiner*—Romain Jeanty
(74) *Attorney, Agent, or Firm*—Stiennon & Stiennon

(57) ABSTRACT

A method for optimizing a production unit, which unit is a unit or a group of units in a papermaking, cardboard, or converting process. The method comprises the steps of analyzing the initial production features, determining the objectives of the production performance, determining the means for upgrading production and determining the upgrade package composition making an agreement with the customer for the means for upgrading production whereby the agreement comprises a step of the customer paying an investment fee (SP) of the upgrade package and a cumulative fee $P_{cum}$ covering the rest of the payment to the vendor.

7 Claims, 2 Drawing Sheets

METHOD FOR SELLING UPGRADE PACKAGES IN PAPERMAKING

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a method for selling upgrade packages in papermaking technology.

In papermaking plants the upgrade packages are sold to old manufacturing systems to enhance the production rate. By the development of the papermaking technology it is possible to improve papermaking efficiency with modern technology. This way more profit can be made with the existing papermaking machinery.

Today papermachines, cardboard machines and converting systems as well as upgrade packages are sold to a customer typically with a payment program which is based on the delivery of goods. The payment program may comprise, e.g. an agreement upon paying most of the price when the system is being manufactured and installed and the rest of it when the guarantee period ends. E.g. 10% of the price may be paid at the end of the guarantee period. A typical guarantee period is 24 months from start of the machine.

In any case, in completing the payment the supplier adjusts the price of the system in a way that the price comprises the costs of manufacturing and installing of the system (COST) and a suitable profit (PROFIT) is added to this sum:

$$P = COST + PROFIT$$

The disadvantage of the current method for the customer for paying for upgrades is the relatively high amount of money needed when beginning using the upgraded machinery.

SUMMARY OF THE INVENTION

An object of the present invention is to provide a novel method for offering upgrade packages to papermaking plants with a more flexible payment program.

Another object of the present invention is to provide a novel method for the supplier to shift the focus from devices to value and services wherein the customer pays more for the actual production and only at the time when it actually becomes productive.

In view of achieving of the objectives stated above the method for optimizing production is mainly characterised by the features presented in the claims.

The present invention makes it possible to make investments and upgrades in a papermaking plant without the need for covering the whole cost of the investment before the upgrade enhances the production. The starting cost may be anything from zero to e.g. 90% of the total cost of the investment. The rest of the investment will be paid to the supplier within an agreed time scale.

BRIEF DESCRIPTION OF THE DRAWINGS

In the following, the invention will be described in detail with reference to the figures in the accompanying drawing, in which.

DESCRIPTION OF THE PREFERRED EMBODIMENTS

An example of an upgrade in which the method according to the invention is applicable is as follows. A conventional supercalender is upgraded to produce SC-A+++ grade with properties:

gloss>55% H
smoothness<1 PPS
air permeability≅5

This kind of supercalender has a special feature of water remoisturization in the stack area.

The upgrade package includes remoisturizers, polymer rolls, thermo rolls and heating system, machine control and automation as well as pilot trials, start up and training. The supplier usually carries the project responsibility. The cost of this type of upgrade is typically in a price range of 4–7 million euros/2 calenders. Annually up to four major rebuilds in this category are made world-wide.

Figure 1:
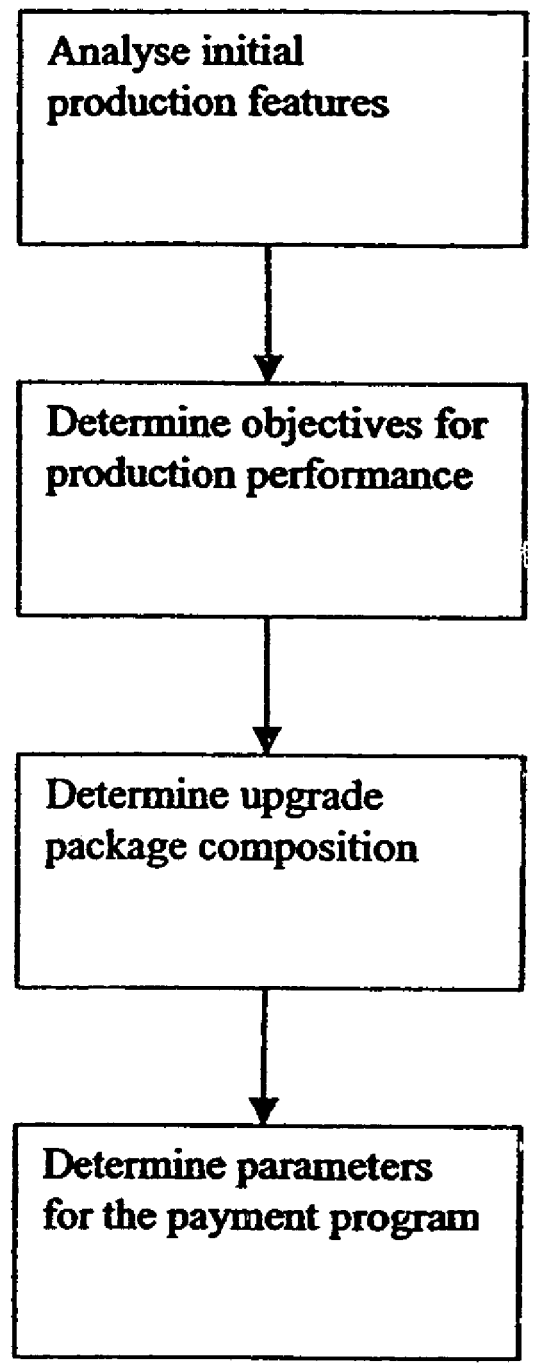
FIG. 1 is a flow diagram demonstrating the method according to the invention.

When an upgrade package is offered to a customer, an analysis of the current situation in the papermaking plant is first made. The analysis includes the alternatives for the composition of the upgrade package. The customer chooses the desired composition of the upgrade and the supplier makes an offer for financing the upgrade package. According to the method of the invention the customer is offered a finance plan which comprises the starting price and the production dependent partial payments. FIG. 1 illustrates the method according to the invention.

The payment method can be described in the formula:

$$P(\text{total}) = SP + P_{cum},$$

in which P(total) is the total price paid by the customer. SP is the starting price or investment fee, which is paid when the upgrade system has been installed (or at the beginning of the guarantee period) and $P_{cum}$ is the cumulative price depending on a chosen production variable.

In the first embodiment of the invention the total price P(total) is determined in time-dependent form as follows:

$$P(\text{total}) = SP + P_{cum} SP + \int y(t),$$

where function y(t) describes the time-dependent part of the price in which t is the running time of the machinery. $P_{cum}(t) = \int y(t)$ forms the cumulative income to the vendor. Cumulative price $P_{cum}$ corresponds to the license fee, service fee, development fee, success fee, or equivalent, which can be requested to be paid once a year or once an agreed time period.

In another embodiment of the method according to the invention the total price P(total) is a function of the production as follows $$P(\text{total}) = SP + P_{cum} = SP + \int y(p),$$

where function y(p) describes the production-dependent part of the price which forms the cumulative income to the vendor. In this case the customer is billed on the basis of the volume of the production.

Figure 2:
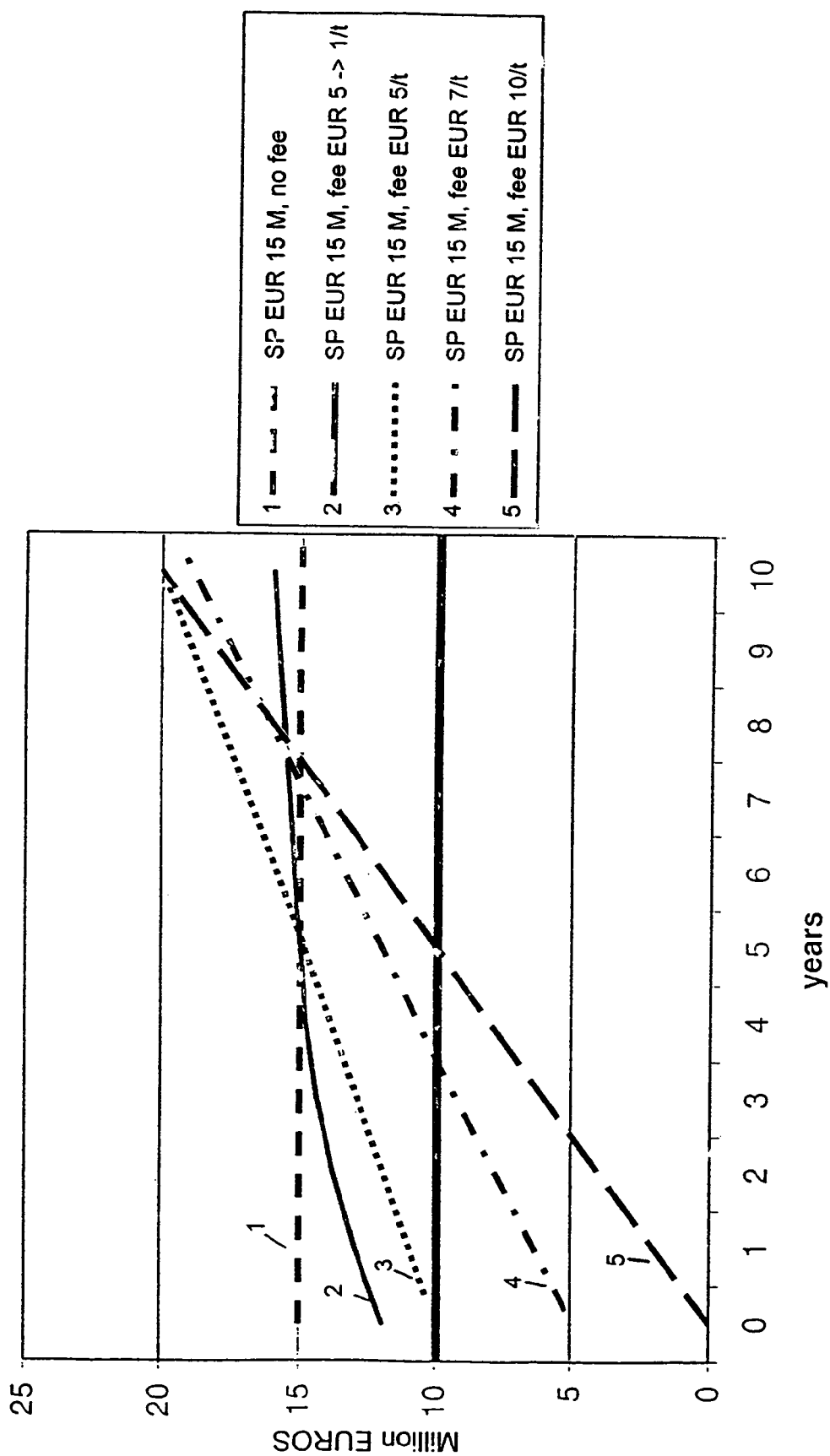
FIG. 2 shows various possibilities of paying the investment.

FIG. 2 shows examples of alternatives for the payment program in graphical form. The vertical axis represents the cumulative income to the supplier (or the investment costs to the customer) in million euros and the horizontal axis represents the time scale in years. As a reference the curve 1 shows a prior art situation in which the customer pays the total investment at one time and there is no cumulative addition to that. Curve 2 shows a case in which a starting fee is 12 million euros and at first the cumulative fee changes in a non-linear way for the first 4 years after which the rest of the cumulative fee stays equal the rest of the remaining license years. In curve 3 the starting fee is lower (10 million euros) and the annual cumulative fee is higher. In curve 4 the starting fee is even lower (5 million euros) and the annual cumulative fee is 7 euros/t. In curve 5 there is no starting fee but the whole investment is paid as a percentage of the production. In all cases the total payment period is 10 years.

The cumulative fee $P_{cum}$ may depend linearly or non-linearly on the production amount and/or time. The function determining the cumulative fee may also comprise various parts with different function shapes. The dependence and the total cumulative fee is determined in the agreement concerning the upgrade package.

In the following the patent claims will be given and various details of the invention may show variation within the scope of the inventive idea defined in the patent claims and differ from the details disclosed above for the sake of example only.

I claim:

1. A method for collecting a fee for an upgrade package for a production unit, which unit is a unit or a group of units in a papermaking, cardboard, or converting process, wherein the production unit has initial production features, and wherein the method comprises the steps of:

analyzing the initial production features of the production unit;

determining a set of objectives for production performance of the production unit;

determining the upgrade package for upgrading the production unit;

determining the upgrade package composition for producing a volume of production; and collecting the fee for the upgrade package by making an agreement with a customer for the upgrade package, wherein the agreement comprises a step of the customer paying a total price for the upgrade package comprising for an investment fee of the upgrade package and a cumulative fee $P_{cum}$ wherein the total price is of the form $P(total)=SP+P_{cum}$, wherein the cumulative fee depends on a production performance (p) such that $P(total)=SP+P_{cum}=SP+\int y(p)$, where y(p) is some function of the volume of production.

2. The method of claim 1 wherein the investment fee equals zero.

3. A method for collecting a fee for an upgrade package for a production unit, which unit is a unit or a group of units in a papermaking, cardboard, or converting process, wherein the production unit has initial production features, and wherein the method comprises the steps of:

analyzing the initial production features of the production unit;

determining a set of objectives for production performance of the production unit;

determining the upgrade package for upgrading the production unit;

determining the upgrade package composition for producing a volume of production; and collecting the fee for the upgrade package by making an agreement with a customer for the for upgrading production, wherein the agreement comprises a step of the customer paying a total price for the upgrade package comprising for an investment fee of the upgrade package and a cumulative fee $P_{cum}$ wherein the total price is of the form $P(total)=SP+P_{cum}$, wherein the cumulative fee depends on running time (t) of the machinery such that $P(total)=SP+P_{cum}=SP+\int y(t)$, where y(t) is some function of running time.

4. The method of claim 3 wherein the investment fee equals zero.

5. A method for collecting a fee for an upgrade package for a production unit, which unit is a unit or a group of units in a papermaking, cardboard, or converting process, wherein the production unit has initial production features, and wherein the method comprises the steps of:

analyzing the initial production features of the production unit;

determining a set of objectives for production performance of the production unit;

determining the upgrade package for upgrading the production unit;

determining the upgrade package composition for producing a volume of production; and collecting the fee for the upgrade package by making an agreement with a customer for the upgrade package wherein the agreement comprises a step of the customer paying a total price for the upgrade package comprising an investment fee (SP) for the upgrade package and a cumulative fee $P_{cum}$ wherein the total price is of the form $P(total)=SP+P_{cum}$, wherein the cumulative fee depends on a production performance (p) or a running time (t) of the machinery such that $P(total)=SP+P_{cum}=SP+\int y(p, t)$, where y(p, t) is some function of the volume of production or the running time of the machinery.

6. The method of claim 5 wherein the cumulative fee $P_{cum}$ depends linearly on the volume of production on the running time of the machinery.

7. The method of claim 5 wherein the cumulative fee $P_{cum}$ depends non-linearly on the volume of production on the running time of the machinery.

* * * * *

UNITED STATES PATENT AND TRADEMARK OFFICE
CERTIFICATE OF CORRECTION

| | | |
|---|---|---|
| PATENT NO. | : 7,181,411 B2 | |
| APPLICATION NO. | : 09/946045 | |
| DATED | : February 20, 2007 | |
| INVENTOR(S) | : Pekka Moisio | |

It is certified that error appears in the above-identified patent and that said Letters Patent is hereby corrected as shown below:

In column 3, line 47 of the issued patent, "comprising for" should be --comprising:--

In column 3, line 47 of the issued patent, "fee of" should be --fee (SP) for--

In column 4, line 16 of the issued patent, "comprising for" should be --comprising: --

In column 4, line 16 of the issued patent, "fee of" should be --fee (SP) for--

In column 4, line 38 of the issued patent, insert a comma after "package"

Signed and Sealed this

Twenty-fourth Day of April, 2007

JON W. DUDAS
*Director of the United States Patent and Trademark Office*